(12) United States Patent
Minotti

(10) Patent No.: US 12,523,189 B2
(45) Date of Patent: Jan. 13, 2026

(54) SPACE PROPULSION SYSTEM

(71) Applicant: Angelo Minotti, Segni (IT)

(72) Inventor: Angelo Minotti, Segni (IT)

( * ) Notice: Subject to any disclaimer, the term of this patent is extended or adjusted under 35 U.S.C. 154(b) by 417 days.

(21) Appl. No.: 16/634,796

(22) PCT Filed: Jul. 26, 2018

(86) PCT No.: PCT/IB2018/055595
§ 371 (c)(1),
(2) Date: Jan. 28, 2020

(87) PCT Pub. No.: WO2019/021234
PCT Pub. Date: Jan. 31, 2019

(65) Prior Publication Data
US 2021/0115879 A1    Apr. 22, 2021

(30) Foreign Application Priority Data

Jul. 28, 2017  (IT) .......................... 102017000087235

(51) Int. Cl.
*F02K 9/62* (2006.01)
*B64G 1/40* (2006.01)
(Continued)

(52) U.S. Cl.
CPC ................ *F02K 9/62* (2013.01); *B64G 1/401* (2013.01); *F02K 9/42* (2013.01); *F02K 9/425* (2013.01);
(Continued)

(58) Field of Classification Search
CPC .............. F02K 9/42; F02K 9/425; F02K 9/44; F02K 9/52; F02K 9/62; F02K 9/68; F02K 9/97; B64G 1/401
See application file for complete search history.

(56) References Cited

U.S. PATENT DOCUMENTS

| | | | |
|---|---|---|---|
| 2,721,788 A | | 10/1955 | Schad |
| 2,827,762 A | * | 3/1958 | Towns, Jr. .............. F02K 7/005 |
| | | | 60/39.35 |
| 3,490,235 A | * | 1/1970 | Grant ....................... F02K 9/68 |
| | | | 60/200.1 |

(Continued)

FOREIGN PATENT DOCUMENTS

| | | |
|---|---|---|
| DE | 2 241 383 A1 | 2/1974 |
| DE | 41 22 755 | 1/1993 |

(Continued)

OTHER PUBLICATIONS

WO-2016116450-A2—Translation (Year: 2016).*

(Continued)

*Primary Examiner* — Kyle Robert Thomas
(74) *Attorney, Agent, or Firm* — NIXON & VANDERHYE

(57) ABSTRACT

A space propulsion system can serve miniaturised satellites, but can be scaled easily, and includes: a combustion chamber implemented by a cylindrical container having cylindrical walls, a first end provided with at least an injection duct for a combustion agent, a fuel and/or a mixture thereof, for the injection according to a direction tangential to the cylindrical walls so as to induce a helical combustion path in the combustion chamber, a possible additional perpendicular injection duct for a fuel or a combustion agent, and an opposite end provided with a discharge duct arranged according to a direction tangential to the cylindrical walls so as to receive and direct the helical path, wherein the cylindrical walls in case have a deposition of catalytic material inside thereof, for accelerating the combustion reaction; and a supersonic nozzle, connected to the discharge duct for discharging the combustion products in the combustion chamber.

19 Claims, 4 Drawing Sheets

(51) Int. Cl.
  *F02K 9/42* (2006.01)
  *F02K 9/44* (2006.01)
  *F02K 9/52* (2006.01)
  *F02K 9/68* (2006.01)

(52) U.S. Cl.
  CPC .................. *F02K 9/44* (2013.01); *F02K 9/52* (2013.01); *F02K 9/68* (2013.01); *F05D 2250/15* (2013.01); *F05D 2250/25* (2013.01)

(56) References Cited

U.S. PATENT DOCUMENTS

| | | | |
|---|---|---|---|
| 3,517,508 A | | 6/1970 | Newman et al. |
| 4,345,729 A | | 8/1982 | Barter |
| 5,279,484 A | * | 1/1994 | Zimmermann .......... B64G 1/12 244/171.1 |
| 5,319,926 A | | 6/1994 | Steenborg |
| 5,399,251 A | * | 3/1995 | Nakamats ............... C25B 15/00 204/262 |
| 5,932,940 A | | 8/1999 | Epstein et al. |
| 2014/0182265 A1 | * | 7/2014 | Kare ........................ F02K 9/44 60/260 |

FOREIGN PATENT DOCUMENTS

| | | |
|---|---|---|
| WO | WO 2016/116450 | 7/2016 |
| WO | WO-2016116450 A2 * | 7/2016 ............. F24S 20/40 |
| WO | 2016/151609 A1 | 9/2016 |

OTHER PUBLICATIONS

NASA, Nozzle Design, Apr. 12, 2009, National Aeronautics and Space Administration (Year: 2009).*
Lemmer, Kristina, Propulsion for CubeSats, Feb. 9, 2017, Acta Astronautica, 134, 231-243 (Year: 2017).*
Wikipedia, CubeSat, Feb. 8, 2017, Wikipedia (Year: 2017).*
Wikipedia, Stoichiometry, Nov. 5, 2015, Wikipedia (Year: 2015).*
International Search Report, PCT/IB2018/055595, dated Nov. 19, 2018.
Office Action issued in Chinese Patent Application No. 201880050261.0 dated Aug. 3, 2022.
Zhen, "Study of The Space Performance of Water-Based Rocket Propulsion System", Chinese Doctoral Dissertations & Master's Theses Full-text Database(Doctor), Engineering Science and Technology II, Jul. 15, 2012, 42 total pages.

* cited by examiner

SPACE PROPULSION SYSTEM

BACKGROUND OF THE INVENTION

Field of the Invention

The present invention relates to a space propulsion system, of the type particularly suitable for a range of small size space satellites, in the specific case miniaturised artificial satellites known under the terms "microsatellite" (10÷100 kg), "nanosatellites" (1÷10 kg) and "picosatellites" (100 g÷1 kg) which can be orbited by low payload launchers, and which can require a propulsion system both with the purpose of correcting their position and performing orbital changes and prolonging the residence time in low orbit.

Description of the Related Art

An example of satellite whereon this propulsion system could be used is constituted by the satellites of CubeSat class, typified by California Polytechnic State University (Cal Poly) and Stanford University, the provided size thereof is that of a cube having 10-cm side, and a weight comprised between 1.0 kg and 1.5 kg, which can be used alone or in cluster (constellation) in a "low" earth orbit, that is with a maximum altitude of 700 km but even lower than 160 km, which usually produces a quick orbit decay due to the interference with the earth atmosphere.

It is important to underline that, nowadays, the nano-pico satellites travel along the release orbit of the main payload, usually a macro-satellite, and they are provided substantially with systems for the positioning and not with propulsion systems so as to allow optimum collocations. This is due to the reduced sizes of the nano-satellites which make difficult to create an effective propulsion system with very small sizes.

It is meant however that the present invention is not to be considered limited to the use in combination of satellites and space probes having reduced sizes, but it can even be used as auxiliary or emergency propulsion for space vehicles having any size, MMU (Manned Maneuvering Unit) devices used for extravehicular activities of astronauts and so on.

Examples of propulsion systems suitable to the above-mentioned purpose are known. The U.S. Pat. No. 5,932,940 A describes a propulsion system for the altimeter check of satellites or for space objects such as probes and the like, which comprises rotating members such as a gas microturbine provided with a compressor.

The presence of rotating portions and the use of gaseous fuels, although they can satisfy some needs in the field of miniaturised satellites, make complex the satellite structure and tend to increase the overall weight thereof, without a real gain in autonomy corresponds thereto.

Other thrust systems provide the use of inert gases pressurized at the liquid state, but they have a limited autonomy and low performances.

Even electrical systems have been proposed wherein the acceleration of particles, in case particles with electric charge, is obtained for example thanks to the Hall effect. These systems require reduced quantities of propulsion fluid and they do not need moving portions, but usually produce thrusts having very low extent.

As contrary features, chemically-based propulsion systems are known, wherein the required energy is obtained by means of a combustion reaction between a fuel and an oxidizing agent. In this case the thrusts which can be obtained have no limit, but it is necessary to include in the vehicle payload even determined amounts of fuel and combustion agent with the related confinement systems.

Moreover, for obvious reasons, the need is particularly felt to have a propulsion system with as much energy effectiveness as possible, but which could produce thrusts of a certain extent, if compared to the sizes of the satellite thereon it would be used.

Zeledon, R. A. "Electrolysis Propulsion for Small-Scale Spacecraft, Cornell University, Dissertation in partial fulfilment of the Requirements for the Degree of Doctor of Philosophy, May 2015—analyses the potentialities of a water propulsion system, with separation electrolytic system, but it uses a low-effective combustion chamber with an electrical (spark) combustion ignition system.

Other examples of propulsion systems which exploit the water electrolysis as fuel and oxygen source are described in the U.S. Pat. Nos. 3,490,235 A; 4,345,729 A and U.S. Pat. No. 3,517,508 A.

SUMMARY OF THE INVENTION

The technical problem underlying the present invention is to provide a propulsion system allowing to obviate the drawback mentioned with reference to the known art.

Such problem is solved by a propulsion system as defined in the enclosed claim 1; additional details of the invention are defined in the enclosed depending claims.

The idea underlying the present invention consists in integrating different technologies therebetween with a combustion chamber with helical inner motion, in case provided with a catalytic deposition on the inner cylindrical surface thereof for accelerating the combustion reaction, and with a nozzle at the discharge of such combustion chamber for creating a thrust.

It is to be meant that this scheme can be used with any combination of fuel and combustion agent, which can be injected separately in the combustion chamber or together in a mixture, suitable to react in the combustion chamber.

In order to manage the payload the combustion agent could be pure oxygen, provided under the form of compressed gas or molecules which can be divided by electrolysis, for example under the form of water.

In a preferred example of the invention, it can comprise a water tank and an electrolytic system, for the division of water into hydrogen and oxygen which then will be recombined in the above-mentioned combustion chamber.

The electrolytic system, operating with gravity or with recirculation pump, can be separated from the tank or integrated therein, thus capable of providing a gaseous mixture of hydrogen and oxygen which can be injected directly in the combustion chamber.

It is further meant that even other compounds could be used as fuel, for example hydrocarbons. A preferred version provides the use of compressed methane.

A propulsion system results therefrom, having reduced sizes, designed specifically for application on miniaturized satellites but which can be easily scaled based upon a wide range of sizes of the target vehicle.

This propulsion system the can make independent the miniaturised satellites, which then could perform autonomous orbit changes, extend their operating life, create constellation of satellites cooperating therebetween; they could extend mission targets of lunar probes and/or deep space; they could vary their position along the orbit depending upon contingent needs; they could operate in low altitude to obtain a better resolution and so on.

BRIEF DESCRIPTION OF THE DRAWINGS

The present invention will be described hereinafter according to some preferred embodiment examples, provided by way of example and not for limitative purposes with reference to the enclosed drawings wherein.

DESCRIPTION OF THE PREFERRED EMBODIMENTS

Figure 1:
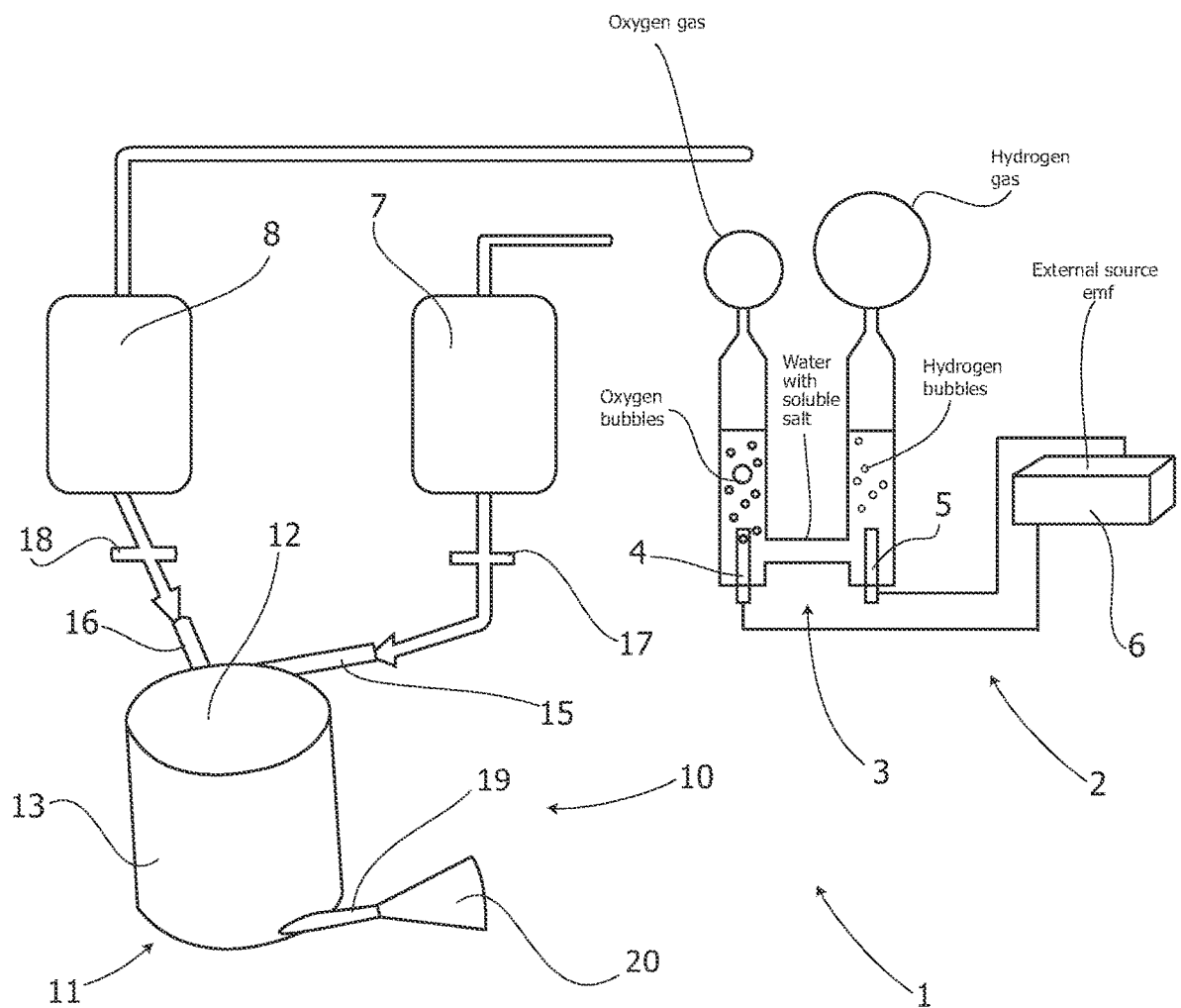
FIG. 1 illustrates the functional scheme of a first embodiment example of a space propulsion system according to the invention.
Figure 2:
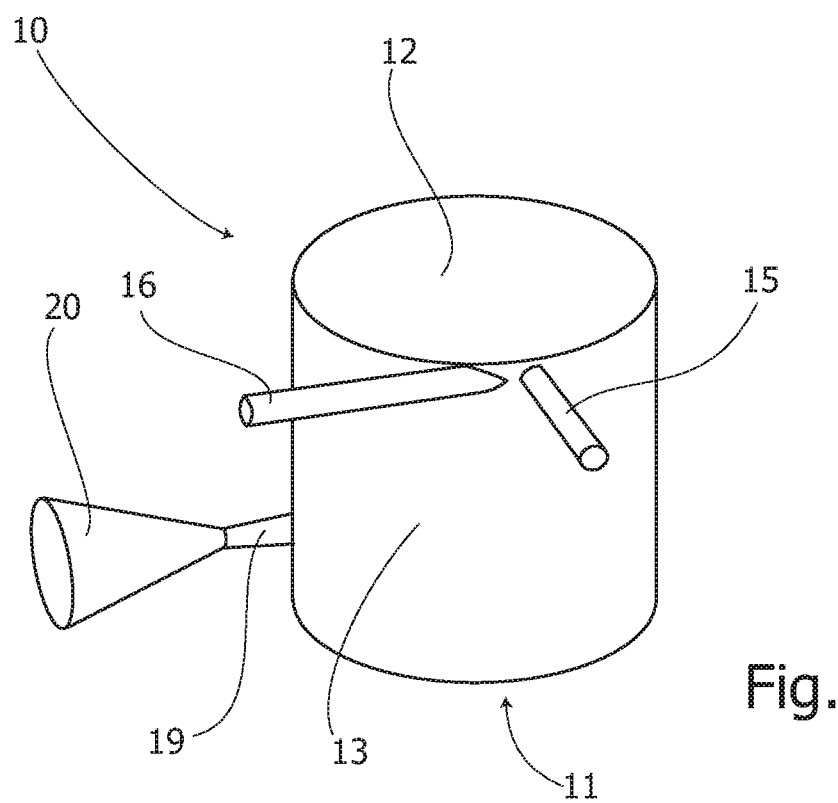
FIG. 2 shows a perspective view of a component, a combustion chamber, of the propulsion system of FIG. 1.
Figure 3:
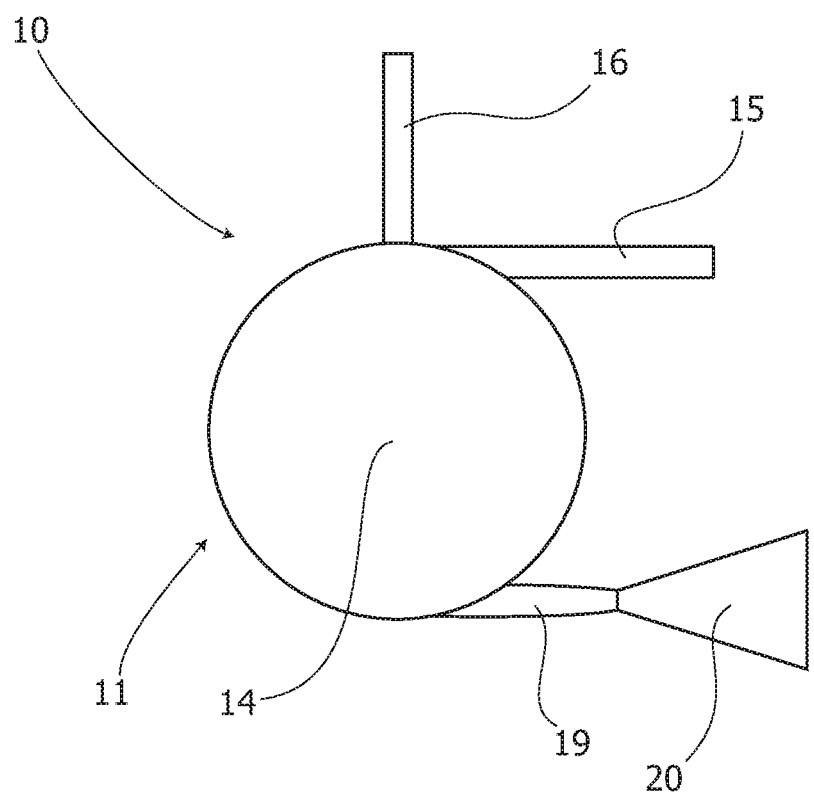
FIG. 3 shows a plan view of the combustion chamber of FIG. 2.
Figure 4:
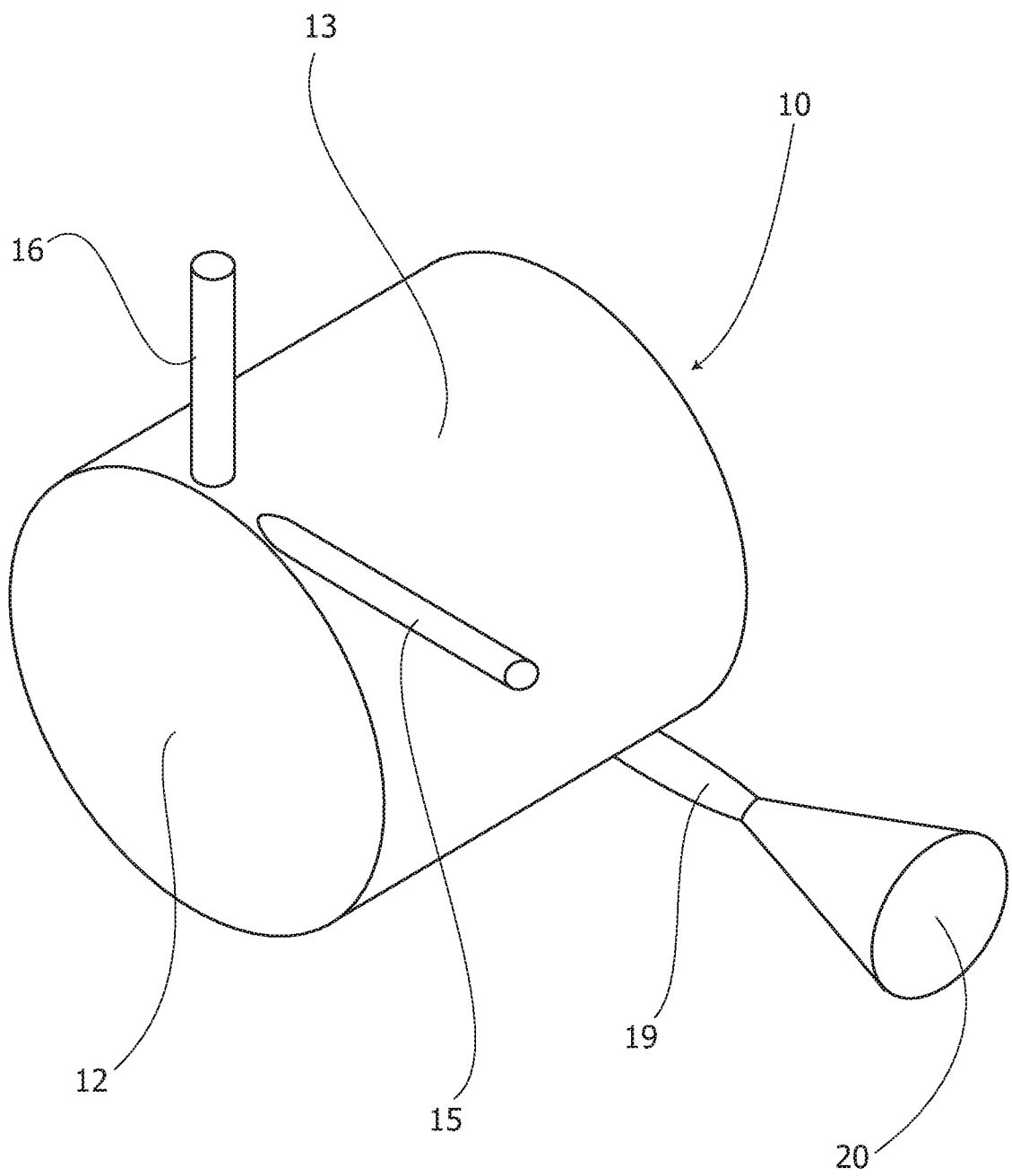
FIG. 4 shows an additional perspective view of the combustion chamber of FIG. 2.

By referring to the figures, a space propulsion system is designated as a whole with 1. It comprises an electrolytic system 2 for dividing liquid water, transported in a container 3 split up into two branches, intended for gaseous hydrogen and oxygen, respectively.

The container 3 of the electrolytic system can constitute the only water tank available to the propulsion system, and this solution is suitable to satellites with minimum sizes, whereas for other larger-sized solutions and payload an additional tank feeding the container 3 can be provided.

The electrolytic system 2 then comprises an anode 4 and a cathode 5, arranged near or inside a respective branch of the container 3, which are subjected to an electric voltage produced by a battery 6, which, in turn, can be charged by a photovoltaic system existing aboard the space vehicle.

It is to be meant that the battery 6 is just a possible example of electric energy among the ones which can be used.

The gaseous oxygen and hydrogen bubble in the respective branches of the tank 3 at the anode 4 and the cathode 5 respectively. Then, they feed a respective tank of oxygen 7 and a respective tank of hydrogen 8 having reduced sizes, since the preservation of the propulsion fluid is implemented under the form of water in the liquid state, wherein hydrogen and oxygen □occupy a minimum space without requiring a complex confinement system.

As it is known, the water should at least be slightly dissociated in ions to allow the passage of electric current. To this purpose, it will include an adequate quantity of electrolyte, for example an acid or a dissolved salt.

The above-mentioned tanks are not strictly necessary but they can be useful should a higher gas injection than the productive capability of the electrolytic system be required, or for having flows characterized by higher pressures than those produced by the simple electrolytic process, or at last to obtain an immediate reaction by the propulsion system 1.

It further comprises a combustion chamber 10, which burns gaseous hydrogen and oxygen, with a helical inner motion so as to increase the residence time of the reagents and of the products so as to allow high combustion efficiencies in very small volumes.

The combustion chamber 10 comprises a cylindrical container 11 developing along a longitudinal axis having a first flat end 12 thereat there are two injection ducts therethrough oxygen and hydrogen are injected. The combustion chamber 10 further has cylindrical walls 13 extending from said first end 12 to a second end 14 wherein the discharge nozzle is positioned.

In particular, a first injection duct 15 is provided which is tangential to the cylindrical walls of the chamber 10 and which is arranged parallel to the plane of the first end 12. The position of the first injection duct 15 is so that it imposes a helical motion to the flow of oxygen and hydrogen which react therebetween.

Furthermore, a second injection duct 16 is provided which is perpendicular to the cylindrical walls of the chamber 10 and it is arranged parallel to the plane of the first end 12. The position of the second injection duct 16 is so that the inlet in the chamber 10 takes place near the inlet of the first duct 15, so that the gaseous flow injected through the first duct 15 intersects the gaseous flow injected through the second duct 16.

In the present example, the first injection duct 15 is fed by gaseous oxygen, whereas the second duct 16 is fed by gaseous hydrogen.

Considering that the available oxygen and hydrogen derive from the water electrolysis, they are provided with the exact required stoichiometric ratio. However, the interposition of tanks 7, 8 could require the presence of respective valves of oxygen 17 and hydrogen 18.

It is to be known that the flow of gaseous oxygen has a rate of flow by weight eight times higher than the rate of flow by weight of the gaseous hydrogen, due to the molar ratio between the two water components.

Therefore, the first injection duct 15 imposes to the gaseous flow resulting from the mixing of the two gases a helical path, with a helix which unwinds for the whole extension of the combustion chamber 10 as far as its second discharge end 14, by lengthening considerably the path of the combustion reaction and then even the related residence time of the reactant gases.

The cylindrical walls 13 of the cylindrical container 12 can show on their inner surface a deposition of catalytic material which produces an acceleration of the combustion reaction between oxygen and hydrogen. Preferably, the catalytic material mainly comprises Platinum.

Thanks to the catalytic material, the temperature for triggering the hydrogen oxidation reaction is lowered. In a preferred version of the device, such lowering, together with the lengthening of the combustion path, allows the ignition of the combustion reaction with development of flame without no outer ignition intervention is required.

Alternatively, the device can be provided with means for flashing an ignition spark in the combustion chamber 10.

In each case, it is meant that the combustion chamber is implemented in one single piece, and it has only the openings necessary to the injection and to the discharge.

Therefore, this combustion chamber exploits the fluid dynamics and the chemistry (catalysis) to increase to the maximum the residence time of the combustion and to reduce to the minimum the time of chemical kinetics. These solutions allow to simplify the construction of the combustion chamber by reducing, at the same time, the sizes thereof.

According to a variant, the combustion chamber 10 could be fed by a different combination of fuel and combustion agent, which could adapt to different situations and propulsion requirements, for example for satellites and space vehicles having larger sizes than those typical of the artificial satellites discussed previously: microsatellites, nanosatellites and picosatellites.

In case of vehicles with larger sizes, they could transport separate tanks of fuel and combustion agent, and in liquid phase, or under supercritical conditions, obtained by compression. These vehicles can include not only satellites but also space vehicles and launchers.

The typical combustion agent could be oxygen whereas the fuel could be a hydrocarbon like methane.

Solutions providing to feed liquid (or supercritical) fuels and combustion agents are also possible; for the first one it is possible to mention liquid hydrogen, kerosene, methanol or ethanol, dinitrogen tetroxide (hydrazine) whereas for the second ones it is possible to mention liquid oxygen, hydrogen peroxide, nitric compounds like nitric acid.

The combustion agent or the fuel requiring the larger range of flow expressed as mass per time unit is conveniently injected in the combustion chamber 10 by using the first injection duct 15, that is the tangential injection duct, whereas the combustion agent or the fuel requesting the smaller range of flow can be injected through the second injection duct 16, that is the perpendicular injection duct, so as to impose to their combination reacting in the combustion chamber a path with helical shape near the inner cylindrical surfaces of the combustion chamber 10.

At said second end 14 of the combustion chamber 10, the propulsion system comprises a sub-supersonic nozzle 20, as discharge of the combustion chamber 10, with a discharge duct which connects it thereto positioned tangential to the cylindrical walls of the chamber 10 and it is arranged parallel to the plane of the second end 14. The position of the discharge duct 19 is so that it receives the above-mentioned helical motion of the flow of the reactant gases which, in the starting example, are water vapour.

The direction of such flow to the discharge duct 19 is the correct one to minimize the pressure drops in this point of the circuit.

The shape of the supersonic nozzle 20 is so as to optimize the expansion of the hot gases existing inside the combustion chamber 10, therefrom it is possible to obtain the thrust necessary for the mission targets.

In the light of what described, it is important to underline that the transportation of liquid water involves very reduced volumes, it does not require any cunning device in terms of safety and it does not require tanks with particular technical features.

Moreover, the electrolytical process, for the division of water into gaseous hydrogen and oxygen, requires low amounts of energy, which can be obtained easily by means of solar cells even with very small sizes.

The gaseous hydrogen and oxygen are the pair of fuel/ combustion agent having the highest performance; the electrolytical process divides the water into oxygen and hydrogen in the optimum stoichiometric proportions which, nominally, provide the best performance with consequent production of only water vapour outgoing from the chamber.

In addition to this, the catalytic deposition, together with the helical fluid dynamics motion inside the combustion chamber, allows to simplify, until totally eliminating, the ignition system, and to reduce to the minimum the required minimum sizes of the chamber in order to have an effective combustion.

Preliminary analyses detect, in order to obtain a thrust of 10 N, global sizes of the propulsion system smaller than 13 m m, with a micro-nozzle which allows to obtain high thrusts in very reduced sizes.

Figure 5:
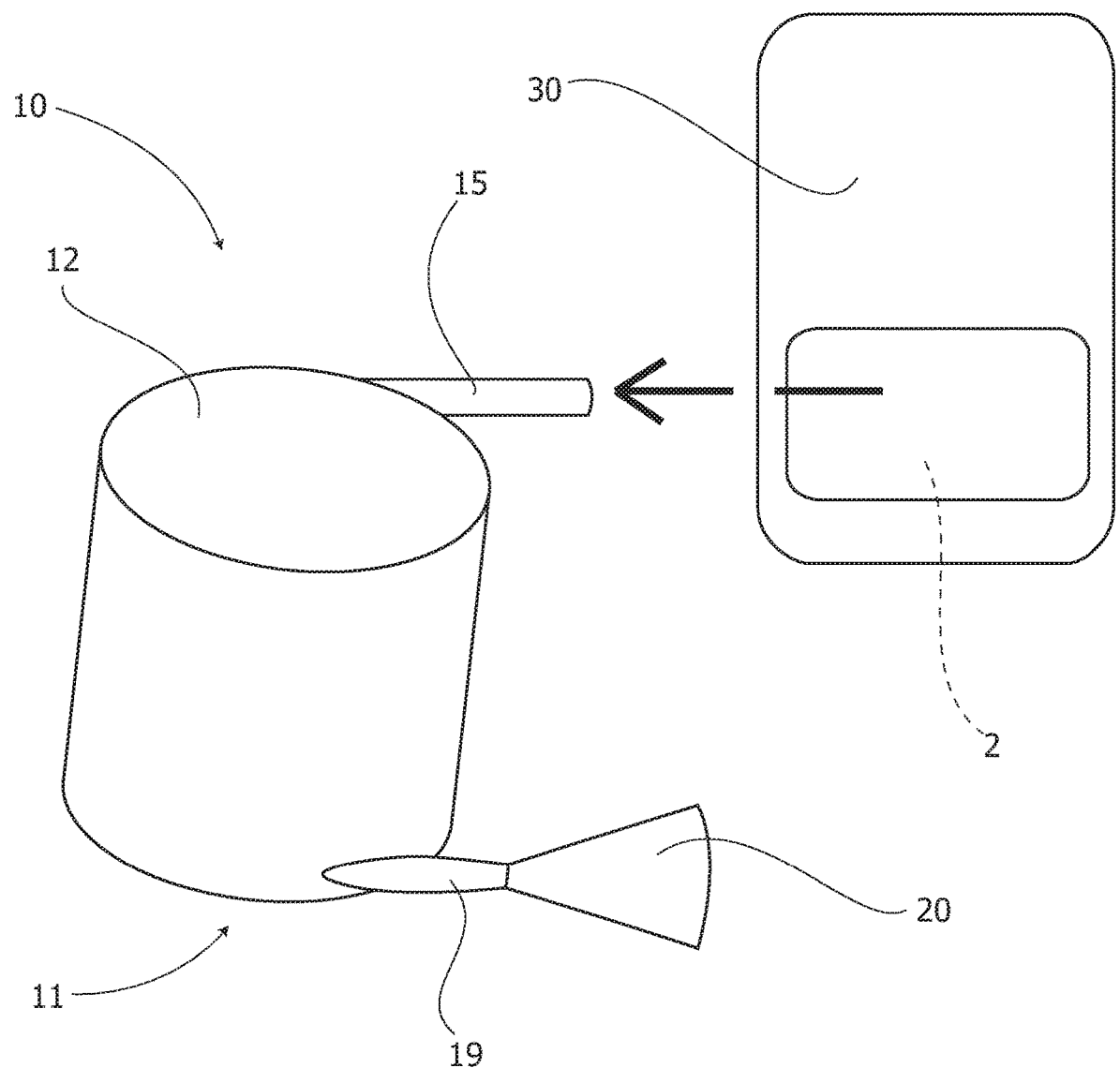
FIG. 5 illustrates the functional scheme of a second embodiment example of a space propulsion system according to the invention 1 to 4.

By referring to FIG. 5, a propulsion system is schematically illustrated and described wherein there is one single tangential injection duct, designated with 15, in the combustion chamber 10. Then it can be fed with a fuel-combustion agent mixture suitably selected based upon the operating needs of the satellite or of the vehicle.

In this example, the injection duct 15 is fed by an electrolyser 2 which was placed inside a tank 30 of water; the electrolyser 2 is fed electrically and produces gaseous $H_2$ and $O_2$ inside the tank 30.

The produced gases are kept separated from the liquid water by the spinning of the satellite, or of the vehicle, and then are introduced, already premixed in the right stoichiometric proportion, into the combustion chamber 10 through the single injection duct 15.

The ignition of the premixed gas can take place by means of an electric spark, or spontaneously by means of catalysis (for example platinum on the inner walls of the chamber). The catalysis in case can support the ignition by means of the spark as in the previous example.

To the above-described propulsion system, a person skilled in the art, with the purpose of satisfying additional and contingent needs, could introduce several additional modifications and variants, however all within the protective scope of the present invention, as defined by the enclosed claims.

The invention claimed is:

1. A space propulsion system (1), comprising:
an electrolytic system (2), fed by an electric source (6), for division of water into oxygen and hydrogen; and
a combustion chamber (10), the combustion chamber being comprised of a cylindrical container (11) having cylindrical walls (13) extending from a first end (12) to an opposite second end (14),
the first end (12) being provided with a first injection duct (15) arranged at a tangent to the cylindrical walls (13), the first injection duct (15) for injection of the oxygen serving as a combustion agent, in a direction tangential to said cylindrical walls so as to induce a helical combustion path in the combustion chamber (10),
wherein the first injection duct (15) is configured to provide a first flow range, expressed as mass per time unit;
a discharge duct (19) connected, at another tangent, to the cylindrical walls (13) at the opposite end (14), the discharge duct (19) arranged in a direction tangential to said cylindrical walls (13) so as to receive and direct said helical combustion path; and
a supersonic nozzle (20), connected to said discharge duct (19) for discharging the combustion products in the combustion chamber,
the space propulsion system (1) being configured for providing propulsion of a satellite, and
a second injection duct (16) provided perpendicular to the cylindrical walls (13) of the combustion chamber (10) and parallel to the plane of the first end (12),
wherein the second injection duct (16) is configured to provide a second flow range, expressed as mass per time unit, a position of the second injection duct (16) is such that an inlet in the combustion chamber (10) takes place at the inlet of the first injection duct (15), so that a gaseous flow injected through the first injection duct (15) intersects another gaseous flow injected through the second injection duct (16),
the second injection duct (16) for injection of the hydrogen in a direction perpendicular to said cylindrical walls, wherein the first flow rate is larger than the second flow rate, wherein the oxygen serving as the combustion agent and requiring the larger, first flow range, expressed as mass per time unit, is injected into the combustion chamber (10) using the first injection duct (15) that is arranged at a tangent to the cylindrical walls (13) of the combustion chamber (10), wherein the hydrogen serving as a fuel and requiring the smaller, second flow range is injected through the second injection duct (16) that is provided perpendicular to the cylindrical walls (13) of the combustion chamber (10), wherein the electrolytic system (2) is arranged and configured for injection of the oxygen in the first injection duct and injection of the hydrogen in the second injection duct, respectively, and wherein the electrolytical system divides the water into the oxygen and the hydrogen in optimum stoichiometric proportions which provides performance with consequent production of only water vapour outgoing from the combustion chamber (10).

2. The space propulsion system (1) according to claim 1, wherein the cylindrical walls have a deposition of catalytic material on an inside surface of the cylindrical walls.

3. The space propulsion system (1) according to claim 2, wherein said deposition of catalytic material comprises mainly Platinum.

4. The space propulsion system (1) according to claim 2, further comprising an electric source, wherein said electric source comprises a battery (6).

5. The space propulsion system (1) according to claim 1, further comprising:
a water tank (30) to which an electrolytic system (2) is associated, fed by an electric source (6), for the division of water into the oxygen and the hydrogen and for injection of the oxygen and the hydrogen in the first injection duct and in the second injection duct, respectively.

6. The space propulsion system (1) according to claim 5, wherein the electrolytic system (2) feeds respective an oxygen tank (7) and a hydrogen tank (8), connected to the combustion chamber by valves (17, 18).

7. The space propulsion system (1) according to claim 1, further comprising a water tank (30) having an electrolytic system (2) inside thereof, fed by an electric source (6), for division of water into the oxygen and the hydrogen and for injection of the oxygen in the first injection duct and injection of the hydrogen in the second injection duct.

8. The space propulsion system (1) according to claim 1, wherein the electrolytic system (2) feeds respective an oxygen tank (7) and a hydrogen tank (8), connected to the combustion chamber by valves (17, 18).

9. The space propulsion system (1) according to claim 8, wherein the electrolytic system (2) has two branches respectively with an anode (4) and a cathode (5), for bubbling gaseous oxygen and hydrogen separately.

10. The space propulsion system (1) according to claim 1, further comprising an electric source, wherein said electric source comprises a battery (6).

11. The space propulsion system (1) according to claim 1, wherein the first end (12) of the cylindrical container (11) is a first flat end (12) and the first injection duct (15) is parallel to a plane of said first end (12).

12. The space propulsion system (1) according to claim 1, comprising means for the ignition of said oxygen, said hydrogen and/or mixture thereof, comprising a deposition of catalytic material.

13. The space propulsion system (1) according to claim 1, comprising means for the ignition of said oxygen, said hydrogen and/or mixture thereof, comprising means for flashing an ignition spark.

14. The space propulsion system (1) according to claim 1, wherein the combustion chamber (10) is implemented as one single piece, and the combustion chamber has only the openings necessary to the injection and discharge.

15. The space propulsion system (1) according to claim 1, wherein said electric source comprises a battery (6).

16. The space propulsion system (1) according to claim 1, in combination with a satellite having a weight of less than 1 kg.

17. The space propulsion system (1) according to claim 1, in combination with a satellite having a weight of less than 10 kg.

18. A space propulsion system (1) in combination with a satellite having a weight of less than 100 kg,
the space propulsion system (1), comprising:
an electrolytic system (2), fed by an electric source (6), for division of water into oxygen and hydrogen while in satellite orbit;
a combustion chamber (10) comprised of a cylindrical container (11) having cylindrical walls (13) extending from a first end (12) to an opposite second end (14), the first end (12) being provided with:
i) a first injection duct (15) arranged at a tangent to the cylindrical walls (13), the first injection duct (15) for injection of oxygen from the electrolytic system (2), the oxygen being injected in a direction tangential to said cylindrical walls so as to induce a helical combustion path in the combustion chamber (10), wherein the first injection duct (15) is configured to provide a first flow range, expressed as mass per time unit, and
ii) a second injection duct (16) provided perpendicular to the cylindrical walls (13) of the combustion chamber (10), wherein the second injection duct (16) is configured to provide a second flow range, wherein the second injection duct (16) is parallel to the plane of the first end (12), a position of the second injection duct (16) being such that an inlet in the combustion chamber (10) takes place at the inlet of the first injection duct (15), so that a gaseous flow injected through the first injection duct (15) intersects another gaseous flow injected through the second injection duct (16), the second injection duct (16) for injection of hydrogen from the electrolytic system (2), the hydrogen being injected in a direction perpendicular to said cylindrical walls,
wherein the first flow rate is larger than the second flow rate, the oxygen from the electrolytic system (2) requiring the larger, first flow range, expressed as mass per time unit, is injected into the combustion chamber (10) using the first injection duct (15) that is arranged at a tangent to the cylindrical walls (13) of the combustion chamber (10), and the hydrogen from the electrolytic system (2) requiring the smaller, second flow range is injected through the second injection duct (16) that is provided perpendicular to the cylindrical walls (13) of the combustion chamber (10);
a discharge duct (19) connected, at another tangent, to the cylindrical walls (13) at the opposite end (14), the discharge duct (19) arranged in a direction tangential to said cylindrical walls (13) so as to receive and direct said helical combustion path; and a supersonic nozzle (20), connected to said discharge duct (19) for discharging the combustion products in the combustion chamber, the space propulsion system (1) being configured for providing propulsion of the satellite, wherein the electrolytic system (2) is arranged and configured for injection of the oxygen and the hydrogen in the first injection duct and in the second injection duct, respectively, and wherein the electrolytical system divides the water into the oxygen and the hydrogen in optimum stoichiometric proportions which provides performance with consequent production of only water vapour outgoing from the combustion chamber (10).

19. A space propulsion system (1), comprising:

an electrolytic system (2), fed by an electric source (6), for division of water into oxygen and hydrogen; and a combustion chamber (10) including a cylindrical container (11) having cylindrical walls (13) comprising a first end (12) provided at least with a first injection duct (15) for a combustion agent, for the injection according to a direction tangential to said cylindrical walls so as to induce a helical combustion path in the combustion chamber (10), the first injection duct (15) for injection of the oxygen serving as the combustion agent, a second injection duct (16) for hydrogen serving as a fuel in direction perpendicular to said cylindrical walls, and an opposite end (14) provided with a discharge duct (19) arranged according to a direction tangential to said cylindrical walls (13) so as to receive and direct said helical path; and a supersonic nozzle (20), connected to said discharge duct (19) for discharging the combustion products in the combustion chamber, the combustion agent requiring a larger flow range, expressed as a mass per time unit, being injected into the combustion chamber (10) using the tangential, first injection duct (15), and the fuel requiring a smaller flow range being injected through the perpendicular, second injection duct (16), wherein the electrolytic system (2) is arranged and configured for injection of the oxygen in the first injection duct and injection of the hydrogen in the second injection duct, respectively, and wherein the electrolytical system divides the water into the oxygen and the hydrogen in optimum stoichiometric proportions which provides performance with consequent production of only water vapour outgoing from the combustion chamber (10).

* * * * *